United States Patent [19]

Marshall et al.

[11] Patent Number: 5,561,416
[45] Date of Patent: Oct. 1, 1996

[54] POSITION SENSING APPARATUS

[75] Inventors: Charles E. Marshall, Novi; Gary J. Denyer, Westland, both of Mich.

[73] Assignee: Ford Motor Company, Dearborn, Mich.

[21] Appl. No.: 432,348

[22] Filed: May 1, 1995

[51] Int. Cl.⁶ .................................................. B60Q 1/00
[52] U.S. Cl. ........................ 340/456; 200/61.88; 477/906
[58] Field of Search ..................... 340/456; 200/61.88 R; 74/335; 477/906

[56] References Cited

U.S. PATENT DOCUMENTS

| | | | |
|---|---|---|---|
| 4,037,196 | 7/1977 | Atkinson et al. | 340/456 |
| 4,100,530 | 7/1978 | den Brinker et al. | 340/456 |
| 4,311,946 | 1/1982 | Pathmann | 318/663 |
| 4,610,179 | 9/1986 | Parker | 200/61.88 |
| 4,882,572 | 11/1989 | Lippmann et al. | 340/456 |
| 4,896,135 | 1/1990 | Deeds et al. | 340/456 |
| 4,914,594 | 4/1990 | Sano | 340/456 |
| 5,064,975 | 11/1991 | Boucher | 200/61.88 |
| 5,111,180 | 5/1992 | Suzuki | 340/456 |
| 5,161,422 | 11/1992 | Suman et al. | 340/456 |
| 5,191,178 | 3/1993 | Baker | 200/61.88 |
| 5,196,663 | 3/1993 | Kurozu et al. | 200/61.88 |
| 5,231,254 | 7/1993 | Baker et al. | 200/61.88 |
| 5,245,313 | 9/1993 | Polityka | 340/456 |
| 5,325,083 | 6/1994 | Nassar et al. | 340/456 |
| 5,338,907 | 8/1994 | Baker et al. | 200/61.88 |
| 5,370,015 | 12/1994 | Moscatelli | 74/335 |
| 5,420,565 | 5/1995 | Holbrook | 340/465 |
| 5,440,087 | 8/1995 | Cobb, III | 200/61.88 |
| 5,469,137 | 11/1995 | Muto | 340/441 |

*Primary Examiner*—Thomas Mullen
*Assistant Examiner*—Daniel J. Wu
*Attorney, Agent, or Firm*—Paul K. Godwin

[57] ABSTRACT

A position sensing apparatus (10) for detecting the manually selected operating mode of an automatic transmission (14) in a motor vehicle comprising a digital position sensor (20) for providing a digital position signal and an analog position sensor (22) for providing an analog position signal. The position sensing apparatus 10 may be used to advantage in a position selection and detection system which further includes a selector (12) for selecting one of a plurality of predetermined selectable positions and a decoder (18) responsive to both the digital position signal and the analog position signal for determining the selected position.

4 Claims, 4 Drawing Sheets

POSITION SENSING APPARATUS

BACKGROUND OF THE INVENTION

The present invention relates generally to position sensors and more particularly to a position sensor for use in determining the manually selected operating mode of an automatic transmission in a motor vehicle.

Several types of transmission position sensors are known which use either a digital or analog scheme for determining position. For example, the manual valve position sensing system shown in U.S. Pat. No. 5,325,083 generates binary codes in response to the position of the manual gear select lever in an automatic transmission. In contrast, the selector position detector shown in U.S. Pat. No. 4,914,594 produces a level signal variable of the level depending upon the selector level position. Yet another scheme, shown in U.S. Pat. No. 5,370,015, employs magnetic sensors to generate coded electrical signals for controlling gear selection in a motor vehicle.

SUMMARY OF THE INVENTION

The present invention is directed to a position sensing apparatus which may be advantageously used to detect the manually selected operating mode of an automatic transmission in a motor vehicle. In a preferred embodiment, described later herein, the apparatus comprises a digital position sensor for providing a digital position signal, an analog position sensor for providing an analog position signal, and a plate member for supporting the digital position sensor and the analog position sensor. The position sensing apparatus may be used to advantage in a system for detecting a selected position of a selector used to manually select between a plurality of predetermined selectable position which further includes a decoder responsive to both the digital position signal and the analog position signal for determining the selected position.

BRIEF DESCRIPTION OF THE DRAWINGS

The invention described herein will be more fully understood by reading the description of a preferred embodiment with particular reference to the drawings wherein like numbers followed by a prime (') refer to like parts throughout the several views and wherein:

FIG. 5 is a flowchart illustrating various process steps performed by a portion of the embodiment shown in FIG. 1.

DETAILED DESCRIPTION OF THE PREFERRED EMBODIMENT

An example of an embodiment in which the invention claimed herein is advantageously used to determine the selected operating mode of an automatic transmission in a motor vehicle is now described with particular reference to the attached figures.

Figure 1:
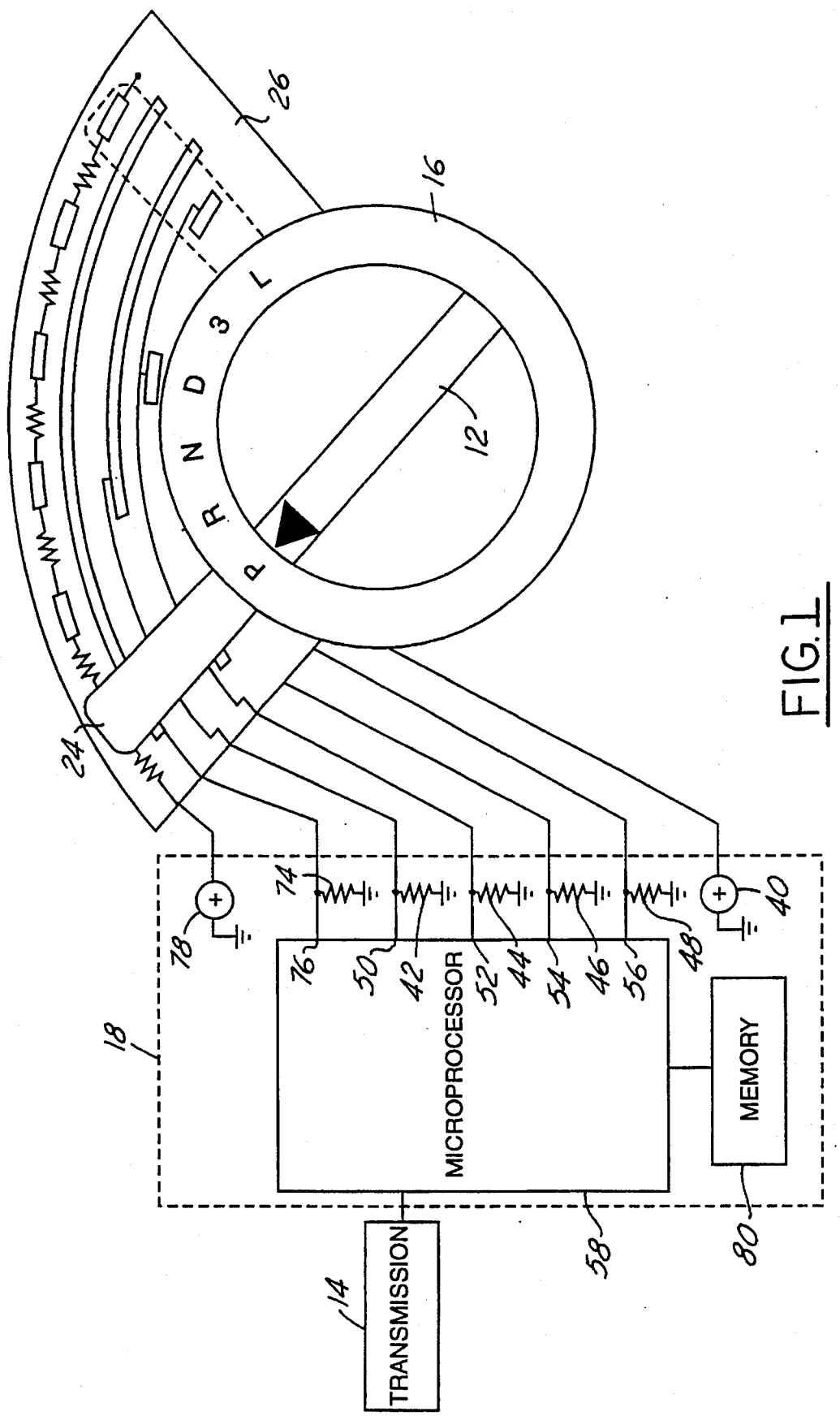
FIG. 1 is a block diagram of a system in which an embodiment of the invention is used to advantage.
Figure 2:
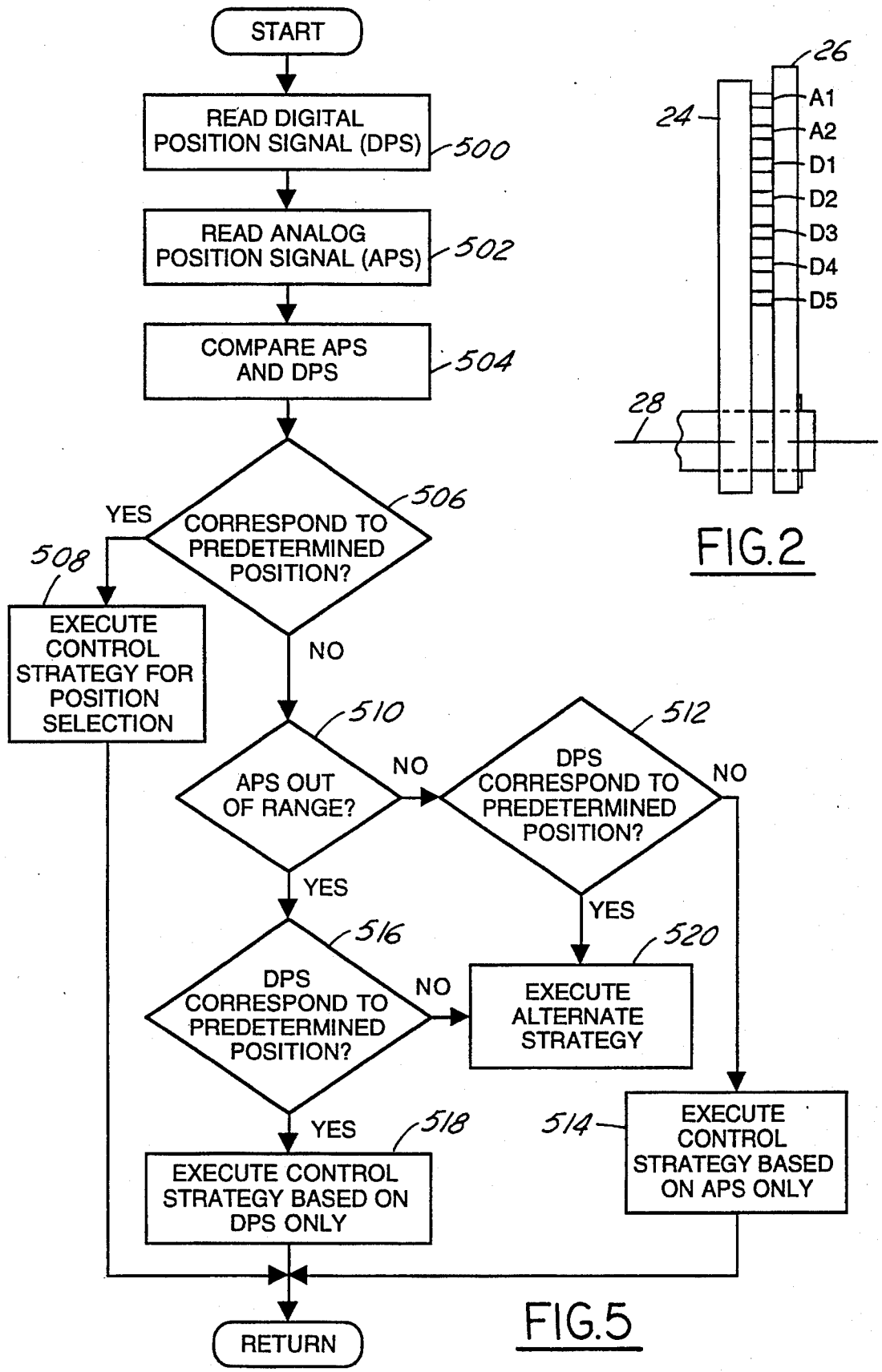
FIG. 2 is side perspective view of a portion of the embodiment shown in FIG. 1.
Figure 3:
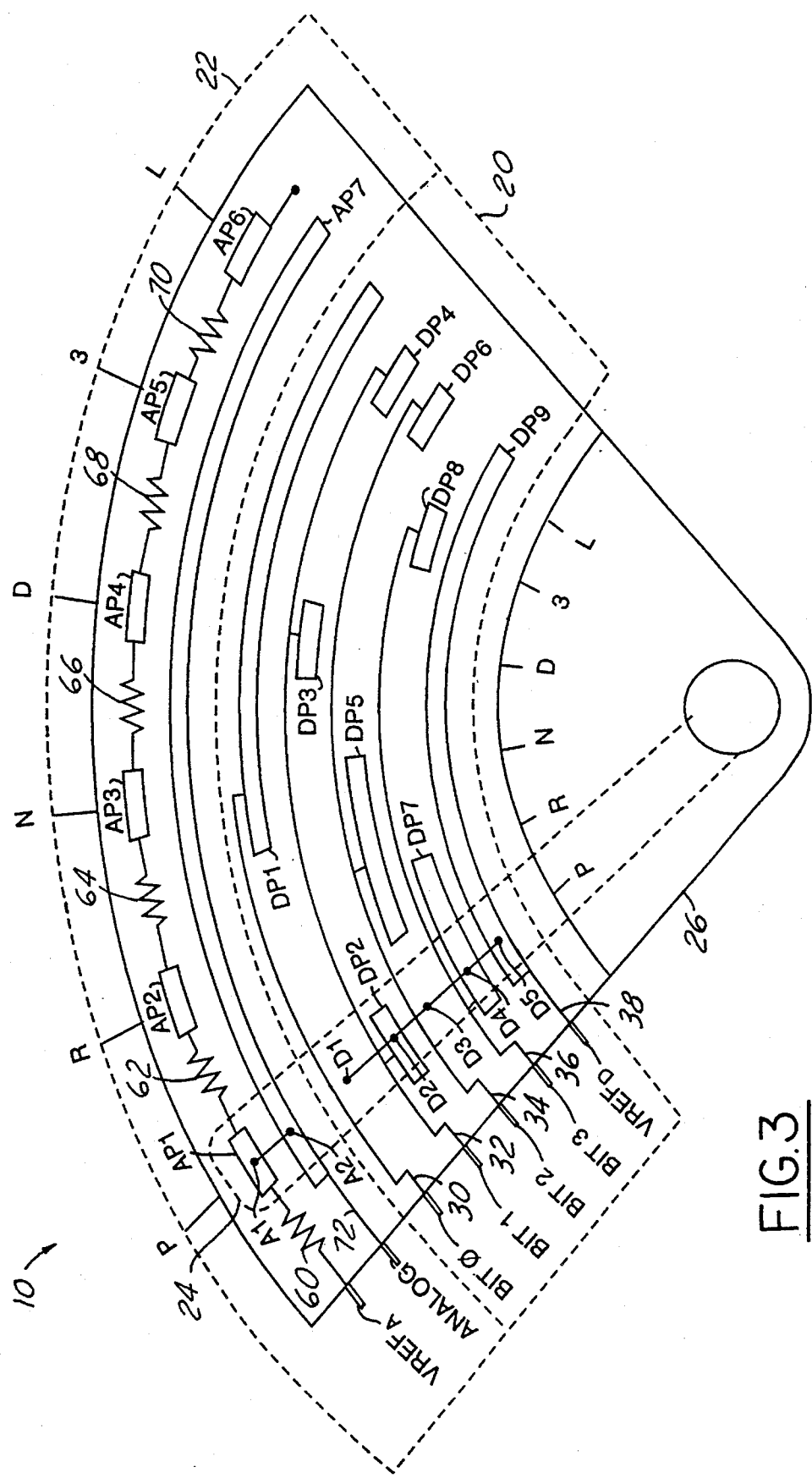
FIG. 3 is a planar view of a portion of the embodiment shown in FIG. 1.

Referring concurrently to FIGS. 1–3, position sensor 10 is shown therein for sensing the manually selected position of shift selector 12 and controlling transmission 14 in response thereto. Shift selector 12 has a number of discrete, selectable positions. In the embodiment shown, for example, the P, R, N, D, 3, and L positions on dial face 16 correspond to typical operating modes of an automatic transmission. As will be described in greater detail later herein, position sensor 10 provides a digital position signal DPS and an analog position signal APS to decoder 18. Decoder 18 in turn processes these inputs to determine the selected position and preferably controls transmission 14 according to conventional electronic transmission control methods in response thereto. Decoder 18 could also advantageously be used to provide control signals to an electronic display (not shown) for indicating the selected position.

Generally, position sensor 10 includes digital position sensor 20 which generates digital position signal DPS and analog position sensor 22 which generates analog position signal APS (see FIG. 3). To generate these signals, position sensor 10 preferably includes an actuator member such as wiper arm 24, contact members such as wiper fingers A1, A2, D1, D2, D3, D4, and D5 which are positioned on wiper arm 24, and a plate member such as wiper board 26.

In the presently described embodiment, wiper arm 24 and wiper board 26 are common to both digital position sensor 20 and analog position sensor 22. Wiper arm 24 is an electrically non-conductive member which is mechanically coupled to selector 12. As selector 12 is rotated to the selected position, wiper arm 24 simultaneously rotates about axis 28 to define a predetermined arcuate path.

Figure 4:
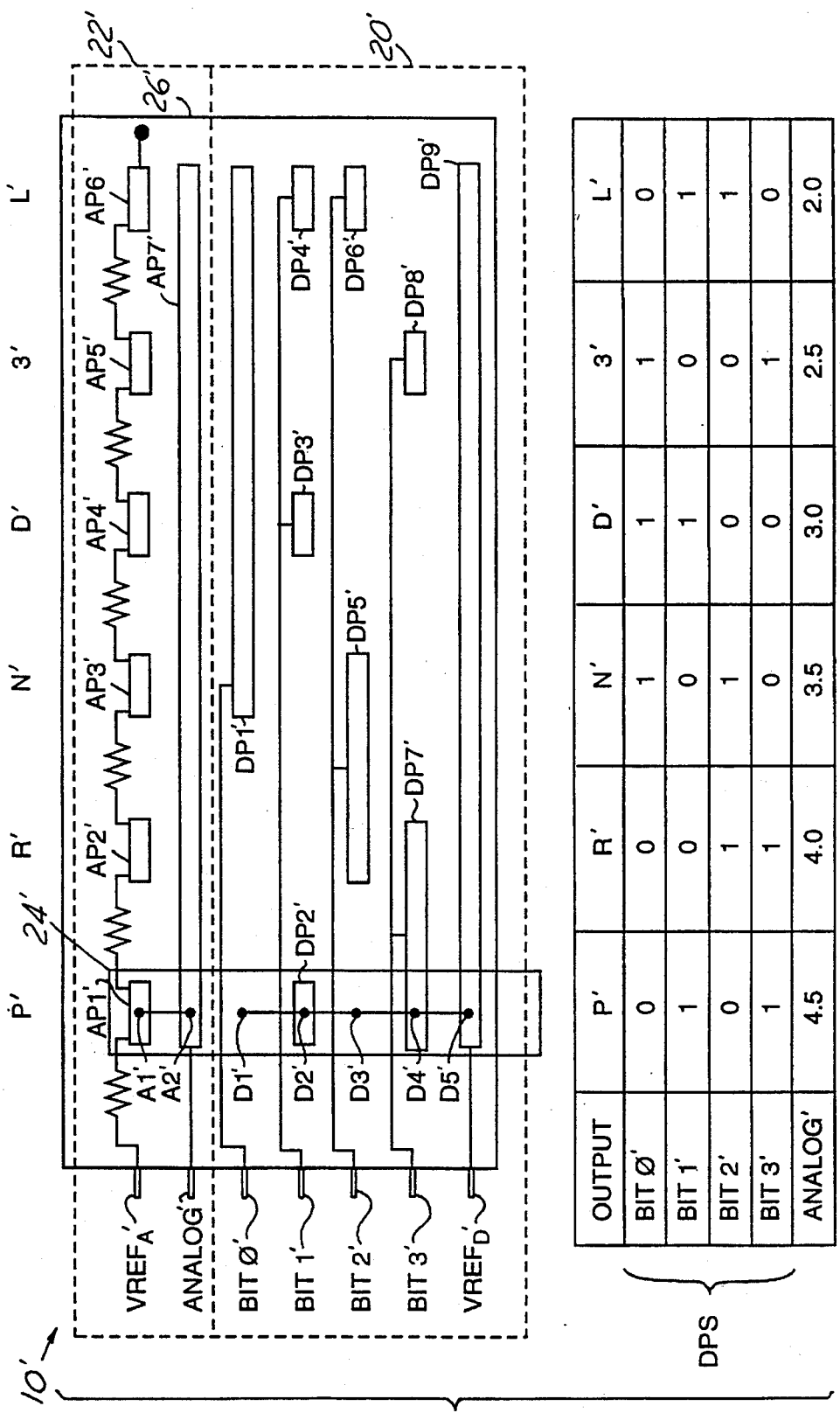
FIG. 4 is a planar view of an alternative embodiment of a portion of the invention shown in FIG. 1.

Wiper board 26 is a rigid, electrically non-conductive member positioned in a plane generally orthogonal to axis 28. In the presently described embodiment, wiper board 26 is generally fan-shaped to correspond with the arcuate range of motion of wiper arm 24. However, one skilled in the art will quickly realize that the size and shape of wiper board 26 generally depends on the range of motion of wiper arm 24. For example, an alternative embodiment wherein wiper arm 24' moves linearly rather than rotationally is shown in FIG. 4 in which primed numerals refer to like parts shown in FIG. 1. In this alternative embodiment, wiper board 26' is generally rectangular-shaped to correspond with the path defined by the linear movement of wiper arm 24'. Obviously the movement between the various components will depend on the design and placement of the components with respect to each other. Therefore, while the preferred embodiment shown in FIGS. 1–3 describes rotational movement between selector 12, wiper arm 24 and wiper board 26, other combinations of linear or rotary-linear movement between the various component parts are certainly not excluded (for example, see FIG. 4).

Continuing with FIGS. 1–3, digital position sensor 20 further includes digital wiper fingers D1–D5, which are electrically interconnected, and digital contact pads DP1–DP9 to generate digital position signal DPS. Digital position signal DPS is provided to decoder 18 through output terminals BIT0, BIT1, BIT2 and BIT3. In the presently described embodiment, digital position signal DPS is a combination of four binary bits: bit0, bit1, bit2 and bit3. Each bit corresponds to its respective output terminal: BIT0, BIT1, BIT2 or BIT3. The signal produced at each output terminal is either a binary high voltage (logical "1") or zero voltage (logical "0").

To generate these voltages at the output terminals, digital contact pads DP1–DP9 are arranged on a surface of wiper board 26 to create a pattern of conductive and non-conductive areas. As shown in FIG. 3, the digital contact pad pattern is divided into arcuate paths corresponding to the arcuate paths defined by each digital wiper finger's range of motion. And, each digital contact pad is electrically coupled to an output or input terminal through leads that are electrically insulated from digital wiper fingers D1–D5. For example, digital contact pad DP1, located in the path of digital wiper finger D1, is electrically connected to output terminal BIT0 through lead 30. Digital contact pads DP2, DP3 and DP4, located in the path of digital wiper finger D2, are connected to output terminal BIT1 through lead 32. Digital contact pads DP5 and DP6, located in the path of digital wiper finger D3, are connected to output terminal BIT2 through lead 34. Digital contact pads DP7 and DP8, located in the path of digital wiper D4, are connected to output terminal BIT3 through lead 36. And, digital contact pad DP9, located in the path of digital wiper D5, is connected to input terminal VREFD through lead 38. As wiper arm 24 rotates, digital wiper fingers D1–D5 contact the conductive and non-conductive areas on the surface of wiper board 26.

The circuitry for interfacing digital position sensor 20 and decoder 18 determines whether digital position signal DPS is generated with positive or negative logic, i.e., whether contact between a digital wiper finger and a digital contact pad produces a logical "1" or a logical "0", respectively. In the presently described embodiment shown in FIG. 1, voltage source 40 provides a digital reference voltage of +5 volts to digital position sensor 20 through input terminal VREFD. A return path to ground is provided through resistors 42, 44, 46 and 48 which connect to output terminals BIT0, BIT1, BIT2 and BIT3 at digital input ports 50, 52, 54 and 56, respectively, of microprocessor 58.

Referring now to FIG. 4, in operation, a high voltage or logical "1" is generated at output terminals BIT0'–BIT3' when the digital wiper finger associated with that output terminal contacts one of the digital contact pads connected to that output terminal. For example, when wiper arm 24' is placed in position P', voltage source 40 (see FIG. 1) provides +5 volts to digital wiper fingers D1'–D5' through digital contact pad DP9'. Bit0 and bit2 of digital position signal DPS sensed at corresponding output terminals BIT0' and BIT2' remain at zero voltage (logical "0") because digital wiper fingers D1' and D3' contact non-conducting areas in their respective paths. In contrast, bit1 and bit3 of digital position signal DPS sensed at corresponding output terminals BIT1' and BIT3' are pulled to +5 volts (logical "1") as the contact between digital wiper finger D2' and digital contact pad DP2' completes a path to ground through resistor 44 (see FIG. 1), and the contact between digital wiper finger D4' and digital contact pad DP7' completes a path to ground through resistor 48 (see FIG. 1). Accordingly, decoder 18 (see FIG. 1) reads digital position signal DPS as "0101".

The processing of digital position signal DPS by decoder 18 to determine the selected position will be described in greater detail later herein. It is sufficient to state at this point that digital contact pads are arranged on the surface of wiper board 26' so that each selectable position is defined by a distinct unique four-bit digital position signal (see FIG.4). The digital contact pads are also arranged to create a family of four-bit combinations with at least two-bit separation between each of the selectable positions. For example, in comparing the bit combinations of position P' and position D' in FIG. 4, bit0 and bit3 of digital position signal sensed at corresponding output terminals BIT0' and BIT3' change logical states.

Returning to FIGS. 1–3, analog position sensor 22 includes analog wiper fingers A1 and A2, which are electrically interconnected, and analog contact pads AP1–AP7 for generating analog position signal APS. Analog position sensor 22 provides analog position signal APS as a voltage whose magnitude depends on the selected position.

To generate the unique magnitudes of voltage at each selectable position, analog contact pads AP1–AP6 are aligned with each selectable position along the arcuate path defined by the range of motion of analog wiper finger A1. Resistors 60, 62, 64, 66, 68 and 70 connect analog contact pads AP1–AP6 in series with terminal VREFA to form a series resistor network. Analog contact pad AP7 connects to output terminal ANALOG through lead 72. Resistor 74 provides a return to ground and sets up a conventional voltage divider for generating analog position signal APS at analog input port 76 of microprocessor 58.

In operation, analog voltage source 78 provides an analog reference voltage, such as +5 volts, to analog position sensor 22 through input terminal VREFA. Analog voltage source 78, as shown in FIG. 1, is an independent voltage source, such as a typical 5 volt regulator, located in decoder 18. However, system complexity could be reduced by using one voltage source to provide both the digital and analog reference voltages to position sensor 10.

Continuing with the operation of analog position sensor 22, as wiper arm 24 is rotated through the selectable positions (P-L), the amount of series resistance in the upper half of the voltage divider increases, thereby decreasing the magnitude of the voltage present at output terminal ANALOG. For example, when wiper arm 24 is in position P, the resistance in the upper half of the voltage divider consists of resistor 60 and the lower half consists of resistor 74. Whereas when wiper arm 24 is rotated to position D, the resistance in the upper half now consists of resistors 60, 62, 64 and 66 in series, while the lower half still consists of resistor 74. Accordingly, the magnitude of the voltage produced at output terminal ANALOG through the contact between analog wiper fingers A1 and A2 and their respective analog contact pads at those positions will proportionately decrease.

Some voltage values for analog position signal APS are shown in FIG. 4 for illustrative purposes. Obviously the resistances can be designed to produce the desired step in voltage for each selectable position. Also, while the present embodiment shows a distinct unique magnitude of voltage for each selectable position (see FIG. 4), other configurations will be readily apparent to those skilled in the art. For example, an analog position sensor for use in an automatic transmission could be designed to have unique values of voltage for positions P, R, N and D, but common values for forward gears D, 3 and L. Such a configuration would require fewer resistors.

An advantage to the combined analog and digital position sensor 10 as described above is that three metric separation is established between each of the selectable positions with a minimal number of output terminals. In other words, at least two bits of digital position signal DPS and the magnitude of analog position signal APS are different between each of the six selectable positions. To achieve three metric separation between each of six positions in an all digital position sensor would require another sensor output terminal.

The operation of decoder 18 in determining the selected position and controlling the operating mode of transmission 14 in response to the selection will now be described with particular reference to FIG. 5. To begin, digital position signal DPS and analog position signal APS are read by microprocessor 58 at the respective digital and analog input ports (steps 500 and 502). The sensed position signals are then logically AND'ed for comparison with valid position codes corresponding to each of the selectable positions (step 504).

In the present embodiment, the position codes are stored in a memory 80 located in decoder 18 (see FIG. 1). Each position code includes a digital portion and an analog portion. The digital portion corresponds to the bit combination which is expected at one of the selectable positions (as defined by the arrangement of the digital contact pads). The analog portion corresponds to the magnitude of voltage expected to be generated at the same selectable position (as defined by the resistor network design).

Using position R' as shown in FIG. 4 as an example, the digital portion of the position code stored in memory 80 for position R' is "0011" and the analog portion of the R' position code is 4.0 volts. Because digital position signal DPS is logically AND'ed with analog position signal APS, both signals must correspond to the same selectable position to match one of the stored position codes.

Continuing with FIG. 5, when the combined position signals correspond to a stored position code (step 506), microprocessor 58 executes a conventional control strategy for controlling transmission 14 according to the selected operating mode (step 508). When the combined position signals do not correspond to a stored position code at step 506, decoder 18 preferably determines an appropriate control strategy based on further analysis of the signals.

In the present system, for example, when a determination is made that analog position signal APS is within the expected range of values (step 510), and digital position signal DPS does not correspond to a prestored digital code (step 512), decoder 18 determines an appropriate control strategy based on analog control signal APS only (step 514). Conversely, when analog position signal APS is not within the expected range (step 510), and digital position signal DPS corresponds to a selectable position (step 516), decoder 18 will execute an appropriate control strategy based on digital position signal DPS only (step 518).

Alternatively, when analog signal APS corresponds to a predetermined value (step 510), but digital position signal DPS corresponds to a different predetermined value (step 512), decoder 18 executes an appropriate alternate control strategy (step 520). Similarly, an alternate control strategy is executed at step 520 when neither analog position signal APS nor digital position signal DPS correspond to any of the predetermined values (steps 510 and 516).

This concludes the description of the preferred embodiment. The reading of it by those skilled in the art will bring to mind many alterations and modifications without departing from the spirit and scope of the invention. For example, while a portion of the present embodiment has been described as steps performed by microprocessor 58, the present invention may also be used to advantage using any number of combinations of digital and analog devices commonly known in the art.

Also, various configurations of digital position sensor 20 and analog position sensor 22 are certainly within the spirit of the invention described above. For example, obviously the configuration of digital position sensor 20 will depend on the number of bits desired for digital position signal DPS and the amount of bit separation desired between selectable positions.

Similarly, analog position sensor 22 may be configured using two contact pads as electrodes extending the length of travel of the respective wiper finger. In such a configuration, the analog reference voltage is provided at one end of the first contact pad, and the other end is routed to ground. The impedance of the contact pad is then designed to linearly vary the voltage output according to the selector position. The second contact pad is made of low impedance material and simply transmits the voltage to analog input port 76 through the bridging of the two electrodes by the contact of the wiper fingers.

Other configurations which come to mind are simply too numerous to describe, accordingly it is intended that the scope of the invention be limited to only the following claims.

What is claimed:

1. A system for detecting a selected position of a selector used to select between a plurality of predetermined selectable positions, comprising:

a digital position sensor for providing a digital position signal corresponding to the selected position;

an analog position sensor for providing an analog position signal corresponding to the selected position; and a decoder responsive to both said digital position signal and said analog position signal for determining the selected position, wherein said decoder comprises a memory for storing predetermined position codes corresponding to the predetermined position codes corresponding to the predetermined selectable positions and wherein each said predetermined position code comprises a digital position code and an analog position code, and said decoder further comprises comparing means for comparing said digital position signal to said digital position codes and said analog position signal to said analog position codes to determine the selected position.

2. A transmission selector system for an automotive vehicle containing an automatic transmission and a manually positioned shift selector member that is positionable in several predetermined positions to cause distinct functions to occur in said transmission, comprising:

first means connected to said selector member for sensing the position of said member and providing a plurality of binary voltages for each monitored position that form a distinct digital signal that is indicative of the position of said member;

second means connected to said selector member for sensing the position of said member and providing a distinct voltage level for each monitored position that is an analog signal indicative of the position of said member;

third means containing a memory for storing representations of signal values that correspond to said predetermined positions, being connected to receive said digital signal from said first means and said analog signal from said second means, and functioning to compare said received signals with said stored representations to determine the position of the selector member.

3. A transmission selector system as in claim 2, wherein said third means is a microprocessor that also stores a plurality of transmission control strategies and utilizes said position determination to determine the appropriate transmission control strategy for the transmission.

4. A transmission selector system as in claim 2 wherein said first means provides a four bit set of binary voltages for each digital signal.

* * * * *